United States Patent
Maeda et al.

[11] Patent Number: 5,861,729
[45] Date of Patent: *Jan. 19, 1999

[54] CHARGER FOR PORTABLE TERMINAL EQUIPMENT HAVING ON-HOOK/OFF-HOOK DETECTING MEANS AND BATTERY IDENTIFYING MEANS

[75] Inventors: Mitsunori Maeda; Kazuki Muneyasu; Masashi Tomura; Hiroshi Kubo; Naoyuki Okumura; Yujiro Murakami; Tetsuya Hanawa; Shinichi Wakayama, all of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 100,995

[22] Filed: Aug. 3, 1993

[30] Foreign Application Priority Data

Nov. 25, 1992 [JP] Japan .................................... 4-315095

[51] Int. Cl.⁶ .................................................. H01M 10/46
[52] U.S. Cl. ............................................ 320/106; 320/110
[58] Field of Search ................................. 320/2, 15, 106, 320/110

[56] References Cited

U.S. PATENT DOCUMENTS

| | | | |
|---|---|---|---|
| 4,006,396 | 2/1977 | Bogut | 320/2 |
| 4,792,743 | 12/1988 | Tsujino et al. | 320/15 |
| 4,849,682 | 7/1989 | Bauer et al. | 320/15 |
| 5,200,686 | 4/1993 | Lee | 320/2 |
| 5,237,257 | 8/1993 | Johnson et al. | 320/2 |
| 5,332,957 | 7/1994 | Lee | 320/2 |
| 5,506,490 | 4/1996 | DeMuro | 320/23 |
| 5,576,610 | 11/1996 | Patino et al. | 320/31 |
| 5,646,501 | 7/1997 | Fishman et al. | 320/2 |
| 5,656,917 | 8/1997 | Theobald | 320/22 |

*Primary Examiner*—Nestor Ramirez
*Assistant Examiner*—Nicholas Ponomarenko
*Attorney, Agent, or Firm*—Armstrong, Westerman, Hattori, McLeland & Naughton

[57] ABSTRACT

A charger for portable terminal equipment, capable of distinguishing a nickel-hydride battery pack and a nickel-cadmium battery pack and of detecting an on-hook/off-hook condition even when the nickel-hydride battery pack is used. The charger includes a charging circuit, a pair of third charging terminals connected to the charging circuit and adapted to be selectively connected to either a pair of first charging terminals of the nickel-hydride battery pack or a pair of second charging terminals of the nickel-cadmium battery pack, and a third auxiliary terminal adapted to be selectively connected to either a first auxiliary terminal of the nickel-hydride battery pack or a second auxiliary terminal of the nickel-cadmium battery pack. The charger further includes a device for comparing a voltage at the third auxiliary terminal with a first reference voltage and detecting the on-hook condition or the off-hook condition of the portable terminal equipment, and a device for comparing the voltage at the third auxiliary terminal with a second reference voltage lower than the first reference voltage and distinguishing the nickel-hydride battery pack and the nickel-cadmium battery pack.

8 Claims, 20 Drawing Sheets

CHARGER FOR PORTABLE TERMINAL EQUIPMENT HAVING ON-HOOK/OFF-HOOK DETECTING MEANS AND BATTERY IDENTIFYING MEANS

BACKGROUND OF THE INVENTION

1. Field of the Invention

The present invention relates to a system for detecting an on-hook/off-hook condition of portable terminal equipment with respect to a charger.

2. Description of the Related Art

An ultimate object of communication is, of course, to enable intention or information to be transmitted or exchanged at once anytime, from anywhere, and by anybody. In addition to a conventional intercommunication between fixed points, a mobile communication has been gradually developed. The mobile communication means a communication between a mobile body such as ship, automobile, or airplane and a fixed point such as home or office, and also means an intercommunication between two mobile bodies. In recent years, a portable telephone as a kind of means for carrying out the mobile communication has been extensively developed.

Since the portable telephone is used as a user is moving, it is essential to employ a battery pack as a power source for the portable telephone. Actually, various types of rechargeable battery pack are employed. In particular, a nickel-hydride battery pack (Ni-MH battery pack) has recently been remarked as a hopeful power source for portable terminal equipment including the portable telephone because of a large ratio of electric capacity/battery volume, which can make the equipment compact and extend an operation time. In the nickel-hydride battery pack, however, a circuit for stopping charging at the time of full charge and a safety circuit for detecting a battery temperature are indispensable for ensuring the safety. Accordingly, when the full charge is reached, a charging current is cut off by the charge stopping circuit, and it is therefore necessary to detect an on-hook/off-hook condition of the portable telephone by any method rather than monitoring of the charging current.

Conventionally, a nickel-cadmium battery pack (Ni—Cd battery pack) is used as a power source for the portable telephone. In the nickel-cadmium battery pack, a slight charging current is continued to flow even after the full charge, that is, a so-called trickle charge is allowed. Accordingly, the on-hook/off-hook condition of the portable telephone is detected by monitoring a charging current. Further, since the nickel-cadmium battery pack is primarily used as a rechargeable battery pack, there occur no problems regarding the mixing with other types of battery pack and the safety against a faulty battery pack or the like.

To further reduce the size and the weight of the portable terminal equipment and further extend the operation time, it has recently been considered to adopt the nickel-hydride battery pack. As mentioned above, the nickel-hydride battery pack must include a charge stopping circuit for stopping a charging current at the time of full charge and a safety circuit for detecting a temperature of the battery pack, so as to prevent the shortening of a life cycle due to continuation of charge even after the full charge.

In the nickel-hydride battery pack including the charge stopping circuit, the charging current is cut off at the time of full charge, so that the on-hook/off-hook condition of the portable terminal equipment cannot be detected by monitoring the charging current. Further, although the nickel-cadmium battery pack is a mainly used battery pack, and no consideration for the mixing with other types of battery pack need not be taken in particular, there is a problem regarding the safety because the outputs from charging terminals of a charger continue to be generated even when no battery pack is connected to the charger.

SUMMARY OF THE INVENTION

It is therefore an object of the present invention to provide a charger for portable terminal equipment which can detect an on-hook/off-hook condition of the portable terminal equipment even when a nickel-hydride battery pack is used.

It is another object of the present invention to provide a charger for portable terminal equipment which can effect charge control peculiar to a battery pack used according to the type of the battery pack.

It is a further object of the present invention to provide a charger for portable terminal equipment which can improve the safety by controlling to stop the outputs from charging terminals when no battery pack is connected.

In accordance with an aspect of the present invention, there is provided a charger for portable terminal equipment, said charger being capable of selectively charging a first battery pack and a second battery pack; said first battery pack having a pair of first charging terminals, a first auxiliary terminal, and a thermistor connected to said first auxiliary terminal; said second battery pack having a pair of second charging terminals and a second auxiliary terminal grounded; said charger comprising a charging circuit; a pair of third charging terminals connected to said charging circuit and adapted to be selectively connected to one of said pair of first charging terminals of said first battery pack and said pair of second charging terminals of said second battery pack; a third auxiliary terminal adapted to be selectively connected to one of said first auxiliary terminal of said first battery pack and said second auxiliary terminal of said second battery pack; first means for comparing a voltage at said third auxiliary terminal with a first reference voltage and detecting one of an on-hook condition and an off-hook condition of said portable terminal equipment; and second means for comparing the voltage at said third auxiliary terminal with a second reference voltage lower than said first reference voltage and distinguishing said first battery pack and said second battery pack.

Preferably, the first means comprises a first operational amplifier having a positive-phase input terminal connected to the first reference voltage and a negative-phase input terminal connected to the third auxiliary terminal, and a pull-up resistor connected between the third auxiliary terminal and a power source. Further, the second means comprises a second operational amplifier having a positive-phase input terminal connected to the second reference voltage and a negative-phase input terminal connected to the third auxiliary terminal.

According to the present invention, when the portable terminal equipment to which the first battery pack is attached is mounted to the charger, a current flows through the thermistor for detecting a temperature of the first battery pack. Accordingly, a certain voltage is generated at the third auxiliary terminal of the charger. This voltage is compared with the first reference voltage to thereby detect the on-hook condition of the portable terminal equipment. Further, this certain voltage is compared with the second reference voltage to identify the first battery pack as the battery pack mounted on the charger.

On the other hand, when the portable terminal equipment to which the second battery pack is attached is mounted to the charger, the third auxiliary terminal of the charger is grounded. This ground potential is compared with the first reference voltage to thereby detect the on-hook condition of the portable terminal equipment. Further, this ground potential is compared with the second reference voltage to thereby identify the second battery pack as the battery pack mounted on the charger.

When the first battery pack or the second battery pack is removed from the charger, the voltage at the third auxiliary terminal of the charger becomes higher than the first reference voltage to thereby detect the off-hook condition of the portable terminal equipment.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
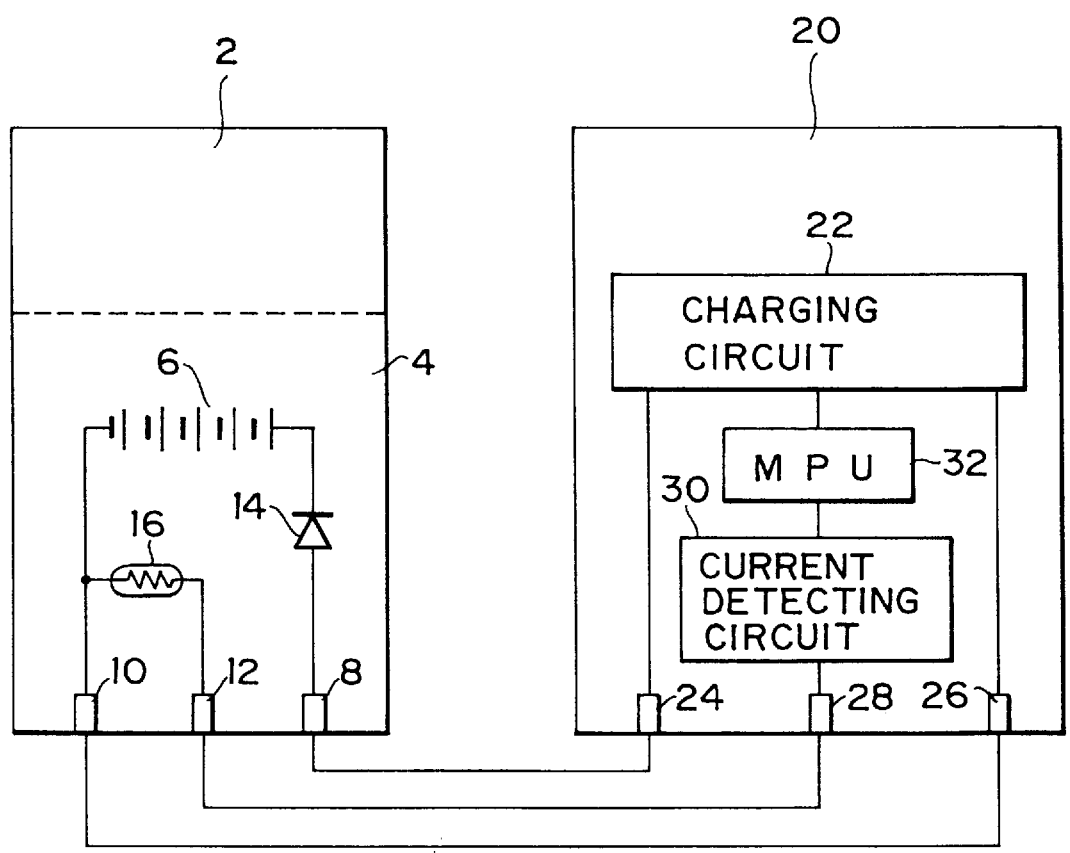
FIG. 1 is a schematic block diagram of the present invention in charging a nickel-hydride battery pack.

Referring first to FIG. 1, there is shown a schematic block diagram of the present invention in charging a nickel-hydride battery pack 4. The nickel-hydride battery pack 4 is mounted on a portable telephone 2. The nickel-hydride battery pack 4 includes a plurality of nickel-hydride cells 6 connected in series. The nickel-hydride battery pack 4 further includes a pair of charging terminals 8 and 10, a thermistor 16 for temperature detection, and an auxiliary terminal 12 connected to one end of the thermistor 16. The other end of the thermistor 16 is connected to the nickel-hydride cells 6. A diode 14 for reverse current prevention is connected between the charging terminal 8 and the nickel-hydride cells 6 to prevent discharge from the nickel-hydride battery pack 4 to a charging circuit 22 provided in a charger 20.

The charging circuit 22 is known in the art, and it includes a charge current measuring circuit and a safety circuit for cutting off the outputs from charging terminals 24 and 26 in accordance with a command from an MPU 32 when the nickel-hydride battery pack 4 is fully charged, or the portable telephone 2 is not mounted thereon. The charger 20 includes a current detecting circuit 30 for measuring a current flowing in the thermistor 16. The current detecting circuit 30 is connected through an auxiliary terminal 28 to the thermistor 16.

Figure 2:
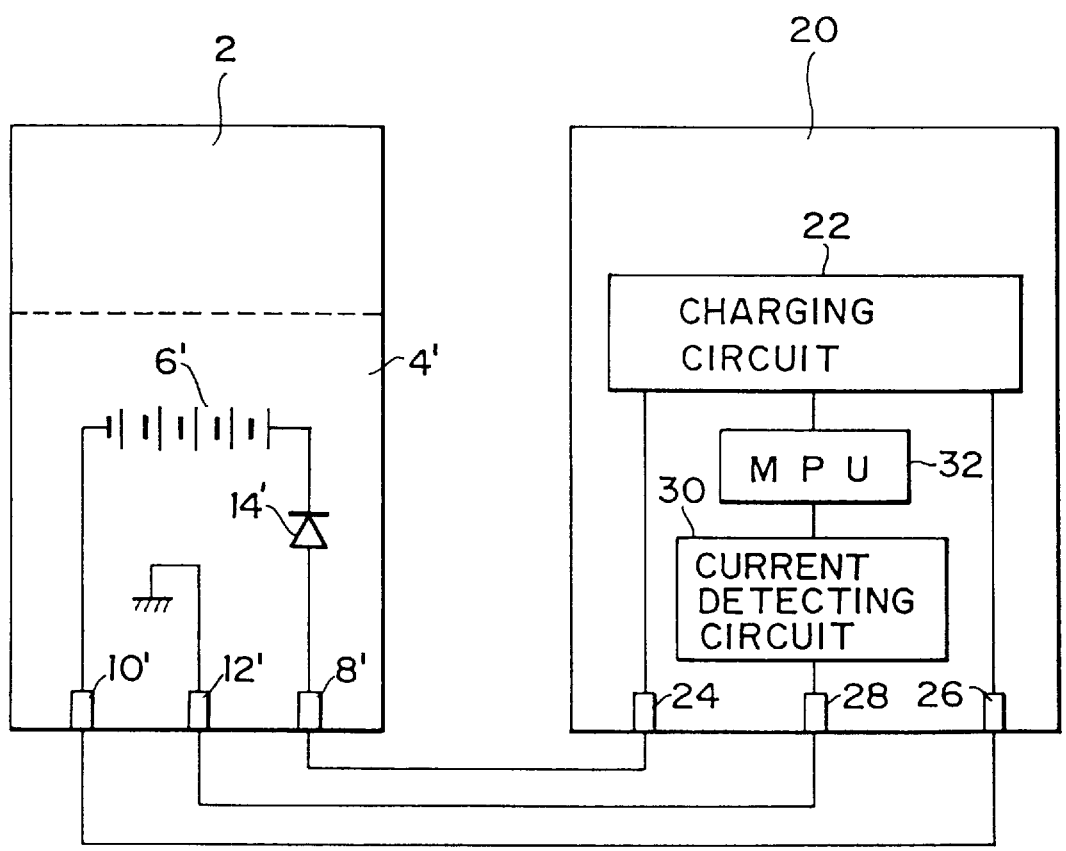
FIG. 2 is a schematic block diagram of the present invention in charging a nickel-cadmium battery pack.

Referring next to FIG. 2, there is shown a schematic block diagram of the present invention in charging a nickel-cadmium battery pack 4'. Like the nickel-hydride battery pack 4, the nickel-cadmium battery pack 4' includes a pair of charging terminals 8' and 10' and an auxiliary terminal 12'. The nickel-cadmium battery pack 4' further includes a plurality of nickel-cadmium cells 6' connected in series and a diode 14' for reverse current prevention connected between the charging terminal 8' and the nickel-cadmium cells 6'. The auxiliary terminal 12' is grounded. The construction of a charger 20 shown in FIG. 2 is similar to that shown in FIG. 1, and so the explanation thereof will be omitted.

Figure 3:
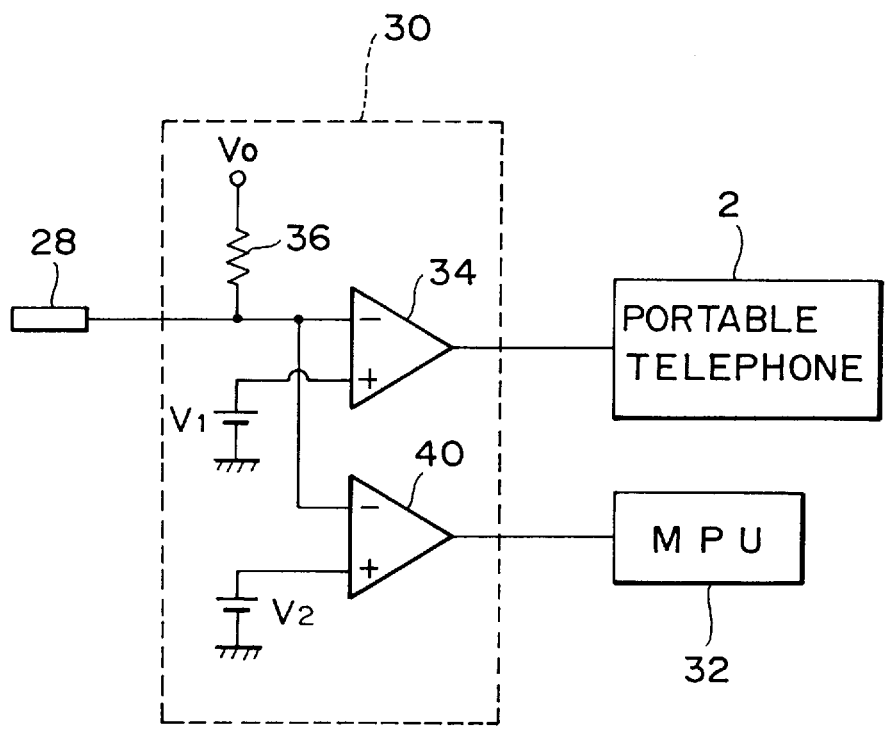
FIG. 3 is a diagram of a current detecting circuit according to a preferred embodiment of the present invention.

A preferred embodiment of the current detecting circuit 30 will now be described with reference to FIG. 3. The current detecting circuit 30 is constructed of a first operational amplifier 34 and a second operational amplifier 40. A positive-phase input terminal of the first operational amplifier 34 is connected to a first reference voltage $V_1$, and a negative-phase input terminal of the first operational amplifier 34 is connected to the auxiliary terminal 28. The auxiliary terminal 28 is connected through a pull-up resistor 36 to a supply voltage $V_0$. A positive-phase input terminal of the second operational amplifier 40 is connected to a second reference voltage $V_2$, and a negative-phase input terminal of the second operational amplifier 40 is connected to the auxiliary terminal 28. An output from the first operational amplifier 34 is applied to the portable telephone 2, and an output from the second operational amplifier 40 is applied to the MPU 32 (Micro Processor Unit).

When the portable telephone 2 employing the nickel-hydride battery pack 4 is connected to the charger 20 as shown in FIG. 1 (i.e., when the portable telephone 2 is in an on-hook condition), a voltage V at the auxiliary terminal 28 is divided by a resistance RS of the thermistor 16 and a resistance R of the pull-up resistor 36 to give the following equation.

$$V = RS \times V_0/(RS+R) \quad (1)$$

When the portable telephone 2 employing the nickel-hydride battery pack 4 is disconnected from the charger 20 (i.e., when the portable telephone 2 is in an off-hook condition), the voltage V at the auxiliary terminal 28 becomes equal to the supply voltage $V_0$ to give the following equation.

$$V = V_0 \quad (2)$$

On the other hand, when the portable telephone 2 employing the nickel-cadmium battery pack 4' is connected to the charger 20 as shown in FIG. 2 (i.e., when the portable telephone 2 is in an on-hook condition), the voltage V at the auxiliary terminal 28 becomes a ground potential because the auxiliary terminal 28 is grounded through the auxiliary terminal 12' in the battery pack 4', thus giving the following equation.

$$V = 0 \quad (3)$$

When the portable telephone 2 employing the nickel-cadmium battery pack 4' is disconnected from the charger 20 (i.e., when the portable telephone 2 is in an off-hook condition), the same equation as Equation (2) is given.

The reference voltages $V_1$ and $V_2$ are set so that the following relation may be satisfied.

$$V_0 > V_1 > V > V_2 > 0$$

where V is the voltage at the auxiliary terminal 28 in charging the nickel-hydride battery pack 4, and $V_0$ is the supply voltage.

For example, when the supply voltage $V_0$ is 5.5 V, the reference voltage $V_1$ is set to 4.8 V, and the reference voltage $V_2$ is set to 1.2 V.

Figure 4:
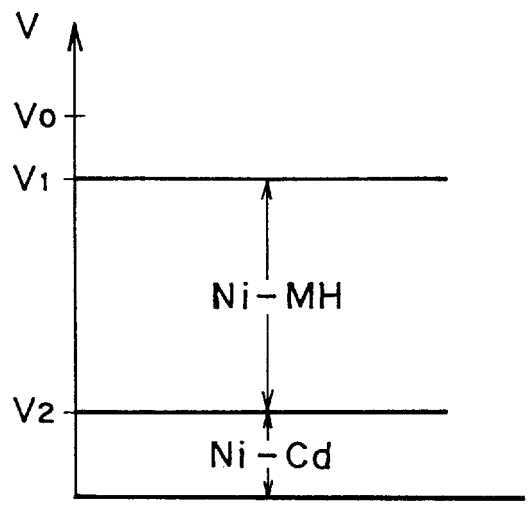
FIG. 4 is a diagram illustrating the relation between a voltage at an auxiliary terminal and the types of the battery pack.
Figure 5A:
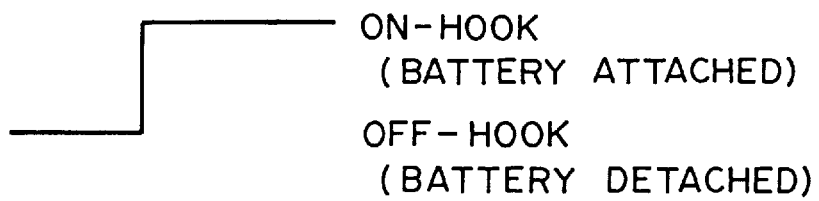
FIG. 5A is a diagram illustrating an output from a first operational amplifier in the current detecting circuit.
Figure 5B:
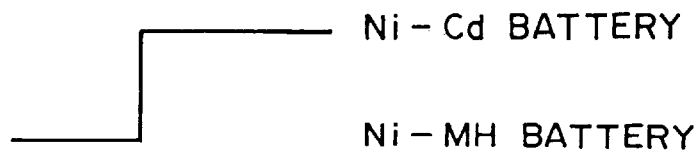
FIG. 5B is a diagram illustrating an output from a second operational amplifier in the current detecting circuit.

FIG. 4 shows the relation between the voltage V at the auxiliary terminal 28 and the types of the battery pack. Under the conditions where the reference voltages $V_1$ and $V_2$ are set above, the output from the first operational amplifier 34 is inverted when the voltage V at the auxiliary terminal 28 is less than the reference voltage $V_1$ to detect the on-hook condition as shown in FIG. 5A. When the voltage V at the auxiliary terminal 28 is less than the reference voltage $V_2$, the output from the second operational amplifier 40 is inverted to identify the nickel-cadmium battery pack 4 as the battery pack connected to the charger 20 as shown in FIG. 5B. Further, when the battery pack is not mounted on the portable telephone 2, the output from the first operational amplifier 34 becomes low as shown in FIG. 5A, thereby detecting no battery. On the other hand, when the battery pack is mounted on the portable telephone 2, the output from the first operational amplifier 34 becomes high.

Figure 6:
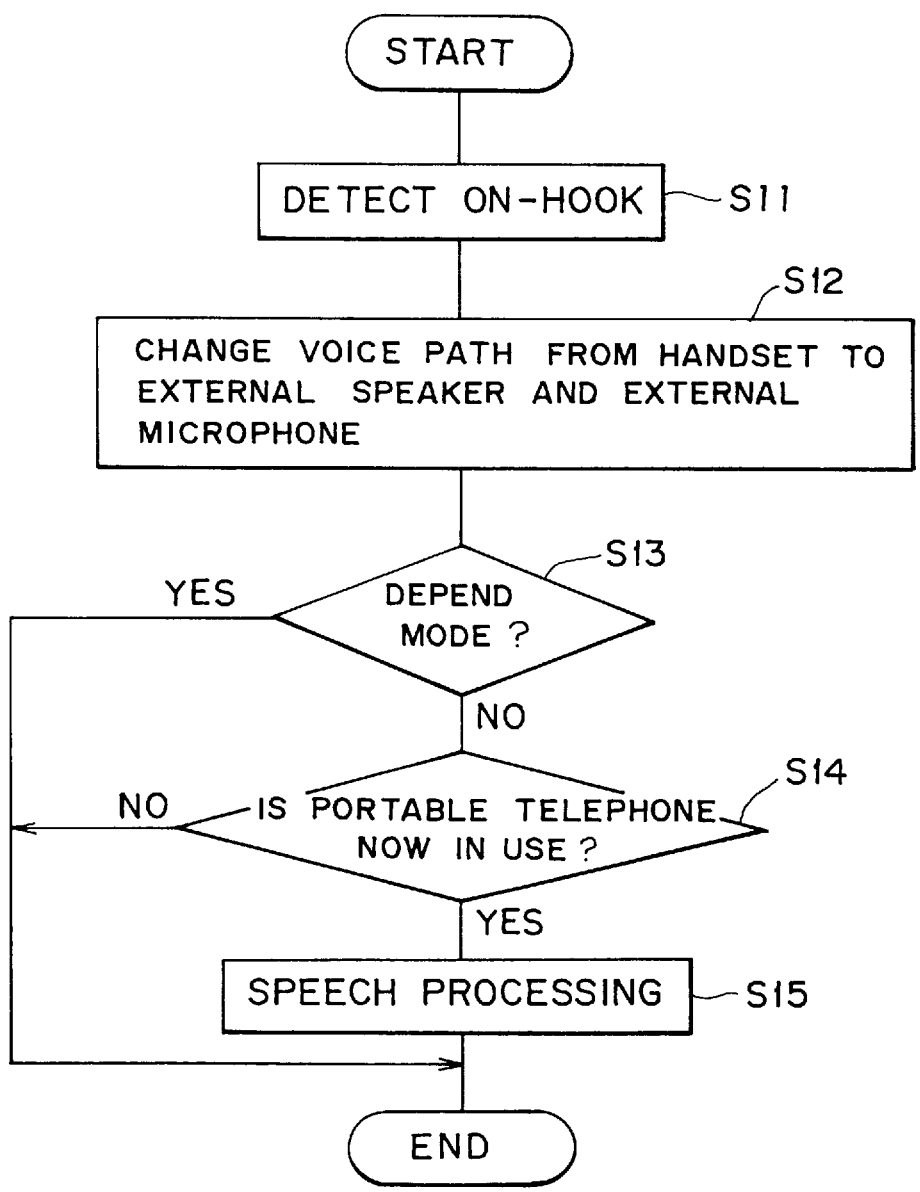
FIG. 6 is a flowchart illustrating the operation in detecting an on-hook condition.

The operation when detecting the on-hook condition will now be described with reference to the flow-chart shown in FIG. 6. When the on-hook condition is detected in step S11, the program proceeds to step S12, in which a voice path is changed from a handset to an external speaker and an external microphone.

Then, it is determined in step S13 whether or not the portable telephone is in a depend mode. If the portable telephone is in the depend mode, the program is ended. If the portable telephone is not in the depend mode, the program proceeds to step S14, in which it is determined whether or not the portable telephone is now in use. If the portable telephone is now in use, the program proceeds to step S15, in which speech processing is carried out. If the portable telephone is not now in use, the program is ended.

Figure 7:
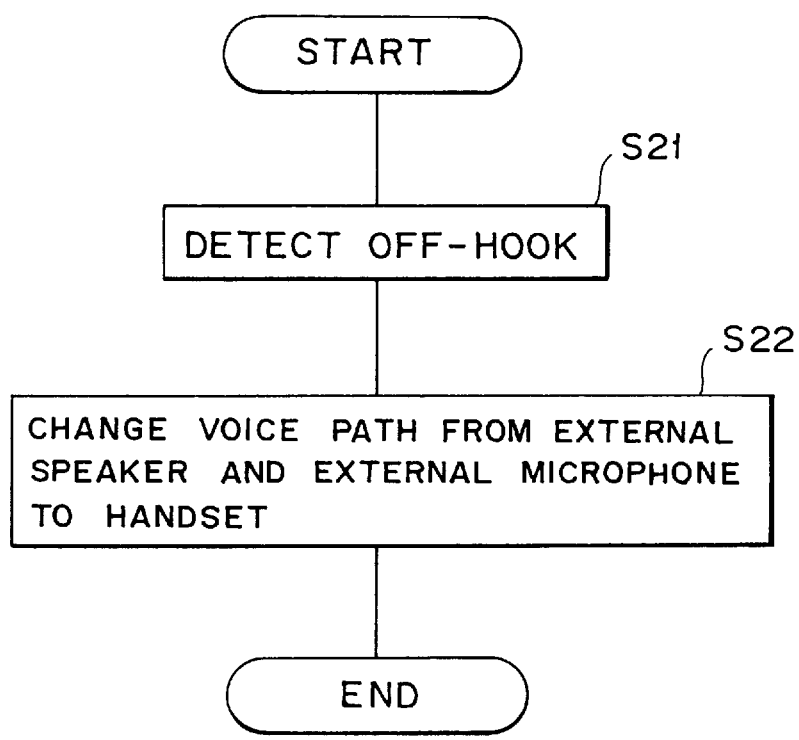
FIG. 7 is a flowchart illustrating the operation in detecting an off-hook condition.

Referring to FIG. 7, there is shown a flowchart when detecting the off-hook condition. When the off-hook condition is detected in step S21, the voice path is changed from the external speaker and the external microphone to the handset, whereby speech through an internal microphone and an internal speaker built in the handset can be carried out.

Figure 8:
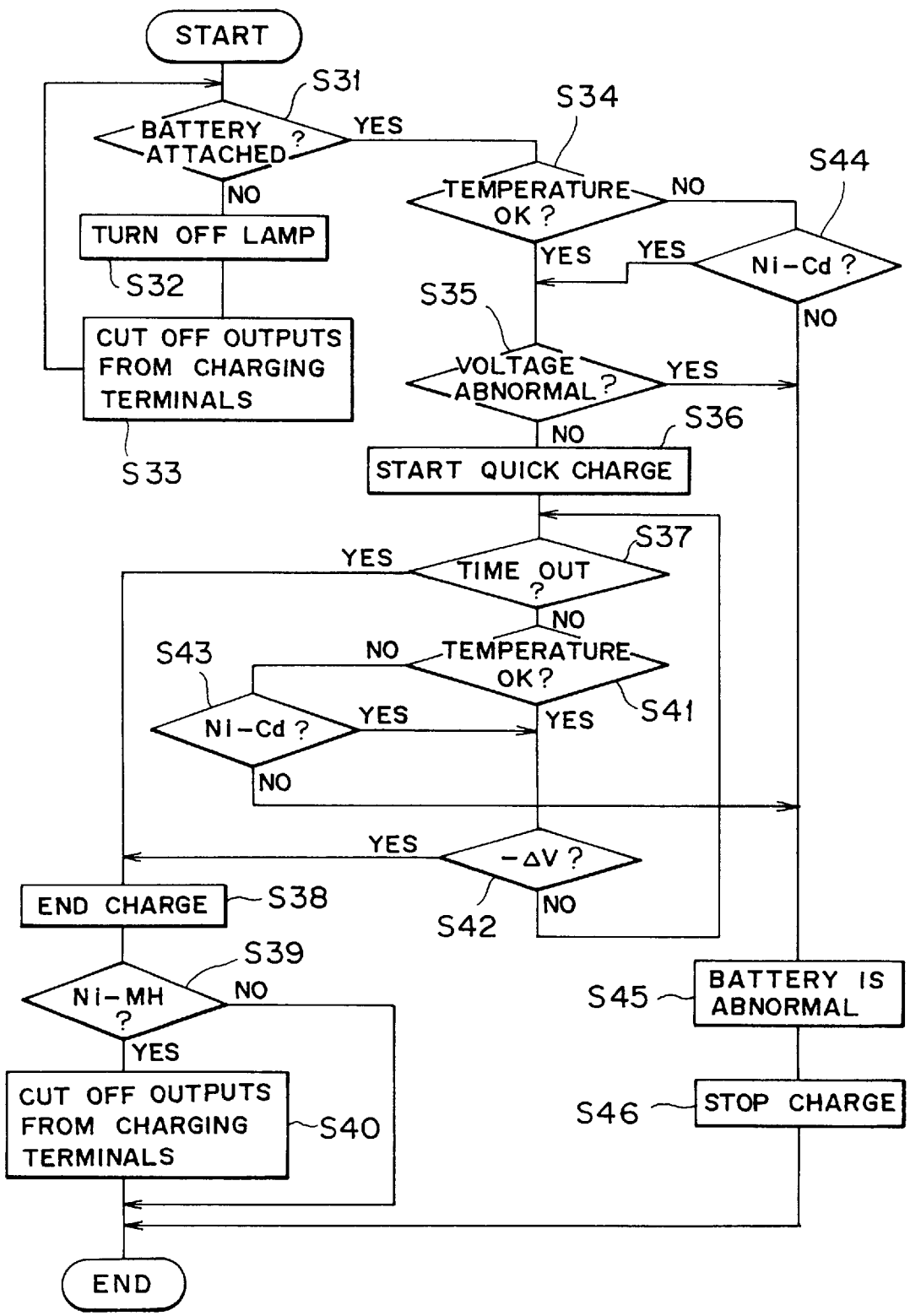
FIG. 8 is a flowchart illustrating the operation of the charger.

Now, the operation of the charger according to the present invention will be described with reference to the flowchart shown in FIG. 8.

In step S31, it is determined whether or not the battery pack is mounted on the portable telephone. If it is determined in step S31 that the battery pack is not mounted, the program proceeds to step S32, in which a charge lamp is turned off, and then the outputs from the charging terminals are cut off in step S33. Then, the program returns to step S31. If it is determined in step S31 that the battery pack is mounted, the program proceeds to step S34, in which it is determined whether or not the temperature of the battery pack is in a predetermined range.

If it is determined in step S34 that the temperature of the battery pack is in the predetermined range (i.e., the battery temperature is normal), the program proceeds to step S35, in which it is determined whether or not the voltage of the battery pack is abnormal. If it is determined in step S35 that the voltage of the battery pack is normal, the program proceeds to step S36, in which quick charge is started. Then in step S37, it is determined whether or not a predetermined charge time has elapsed. This charge time is previously determined according to the type and the capacity of the battery pack, e.g., 120 minutes for a large-capacity nickel-cadmium battery pack, 60 minutes for a small-capacity nickel-cadmium battery pack, 150 minutes for a large-capacity nickel-hydride battery pack, and 100 minutes for a small-capacity nickel-hydride battery pack.

If it is determined in step S37 that the predetermined charge time has elapsed, the program proceeds to step S38, in which the charge is ended. Then in step S39, it is determined whether or not the battery pack is the nickel-hydride battery pack. If it is determined in step S39 that the battery pack is the nickel-hydride battery pack, the program proceeds to step S40, in which the outputs from the charging terminals are cut off. Then, the program is ended. If it is determined in step S39 that the battery pack is the nickel-cadmium battery pack, the outputs from the charging terminals are not cut off, but the program is ended.

If it is determined in step S37 that the predetermined charge time has not elapsed, the program proceeds to step S41, in which it is determined again whether or not the temperature of the battery pack is in the predetermined range. If it is determined in step S41 that the temperature of the battery pack is normal, the program proceeds to step S42, in which a slope $\Delta V$ of the charging voltage with respect to the time is measured, and it is determined whether or not the slope $\Delta V$ has become $-\Delta V$ after reaching of a peak voltage. If the slope $-\Delta V$ is detected in step S42, the program proceeds to step S38, in which the charge is ended. If the slope $-\Delta V$ is not detected in step S42, the program returns to step S37.

If it is determined in step S41 that the temperature of the battery pack is not in the predetermined range, the program proceeds to step S43, in which it is determined whether or not the battery pack is the nickel-cadmium battery pack. If it is determined in step S43 that the battery pack is the nickel-cadmium battery pack, the program proceeds to step S42 to detect the slope $-\Delta V$. If it is determined in step S43 that the battery pack is the nickel-hydride battery pack, the program proceeds to step S45, in which it is determined that the battery pack is abnormal, and the program then proceeds to step S46, in which the charge is stopped.

If it is determined in step S34 that the temperature of the battery pack is not in the predetermined range, the program proceeds to step S44, in which it is determined whether or not the battery pack is the nickel-cadmium battery pack. If it is determined in step S44 that the battery pack is the nickel-cadmium battery pack, the program proceeds to step S35. If it is determined in step S44 that the battery pack is the nickel-hydride battery pack, the program proceeds to step S45, in which it is determined that the battery pack is abnormal, and the program proceeds to step S46, in which the charge is stopped.

In the case where the battery pack is determined as the nickel-cadmium battery pack in step S43 and step S44, the battery pack is determined not to be abnormal even when the temperature of the battery pack is not in the predetermined range. This is due to the fact that even a somewhat increase in the temperature of the nickel-cadmium battery pack does not cause a danger. Accordingly, the nickel-cadmium battery pack does not include a thermistor, and temperature detection is not carried out.

In the charger according to the present invention, when the battery pack is not mounted, or the charge to the nickel-hydride battery pack is ended, the outputs from the charging terminals are cut off in step S33 or step S40, respectively. Accordingly, the safety in charging can be improved.

Figure 9:
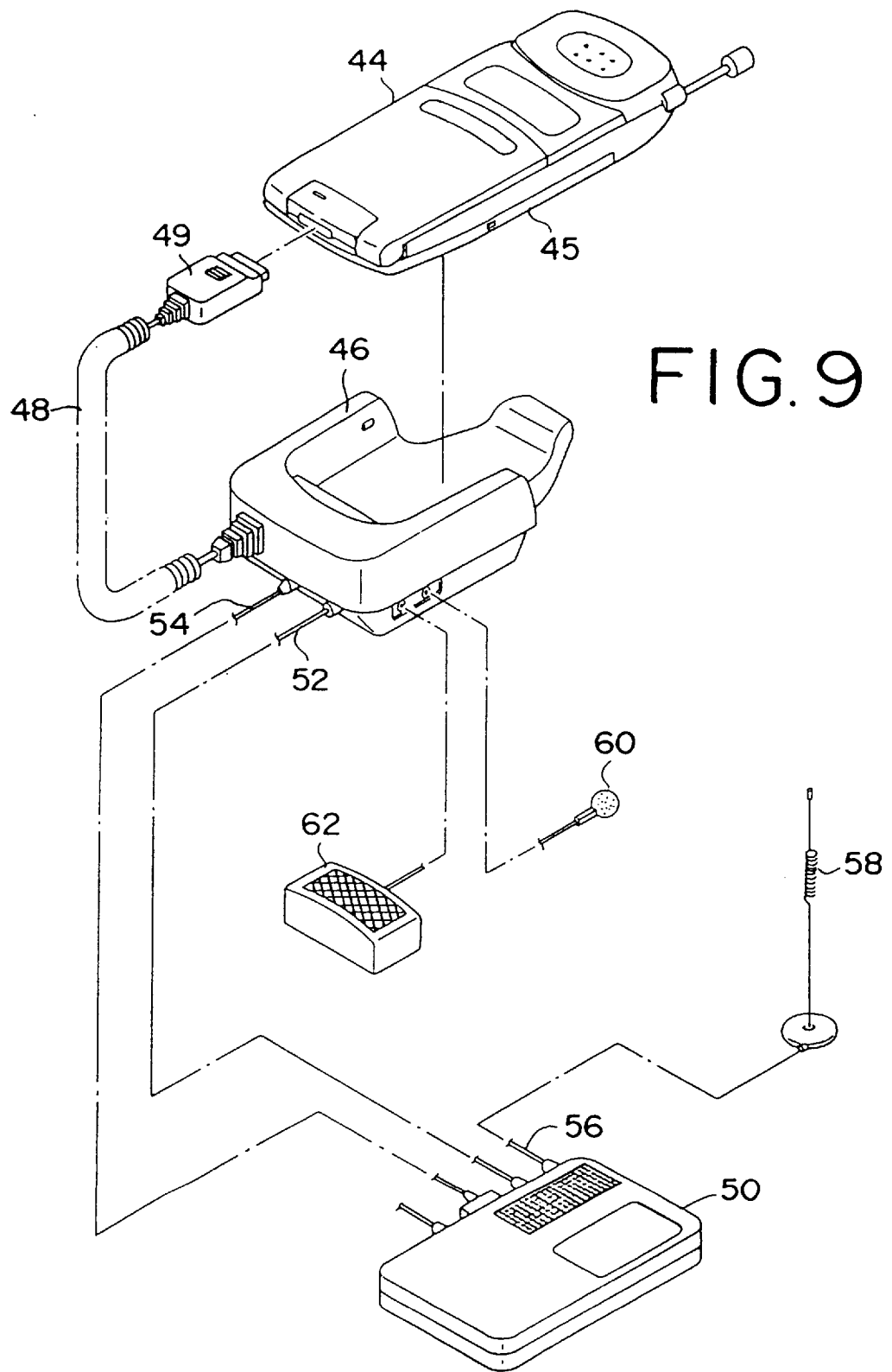
FIG. 9 is a perspective view of an on-vehicle adapter and a portable telephone.

Referring to FIG. 9, there is shown a perspective view of an on-vehicle adapter and a portable telephone adapted to be mounted thereon to which the present invention is applicable. A battery pack 45 is detachably mounted on a lower surface of a portable telephone 44. The portable telephone 44 is detachably mounted on an on-vehicle adapter 46. The on-vehicle adapter 46 is electrically connected through a curl cord 48 and a connector 49 to the portable telephone 44.

A microphone 60 and a speaker 62 in a hands-free unit are connected to the on-vehicle adapter 46. The on-vehicle adapter 46 is connected through a control signal cable 52 and a coaxial cable 54 to a booster amplifier 50. The booster amplifier 50 is connected through a coaxial cable 56 to an external antenna 58. The booster amplifier 50 includes an on-hook/off-hook detecting circuit, a battery identifying circuit, a charging circuit, etc. as mentioned above.

Figure 10:
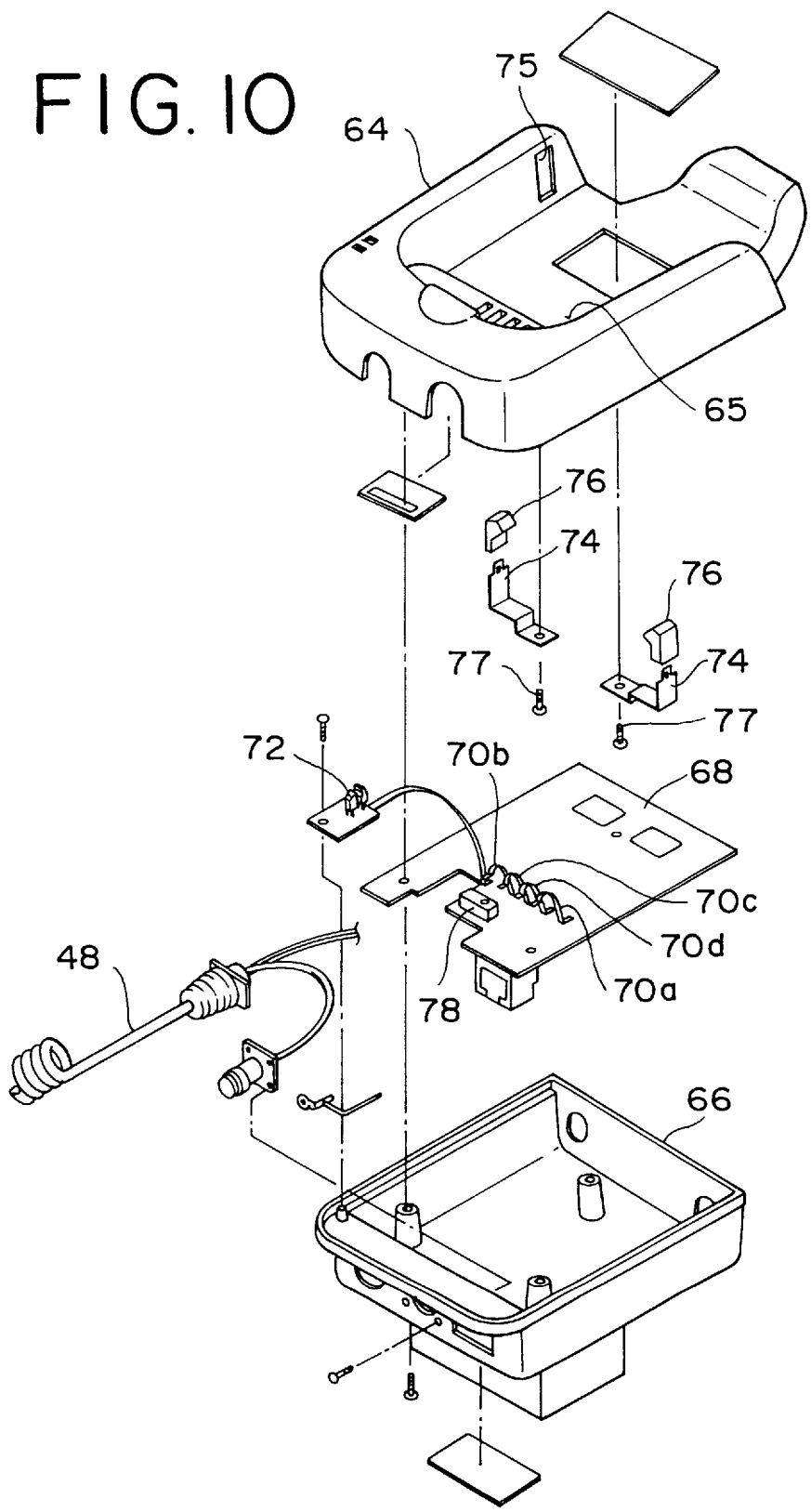
FIG. 10 is an exploded perspective view of the on-vehicle adapter.
Figure 12A:
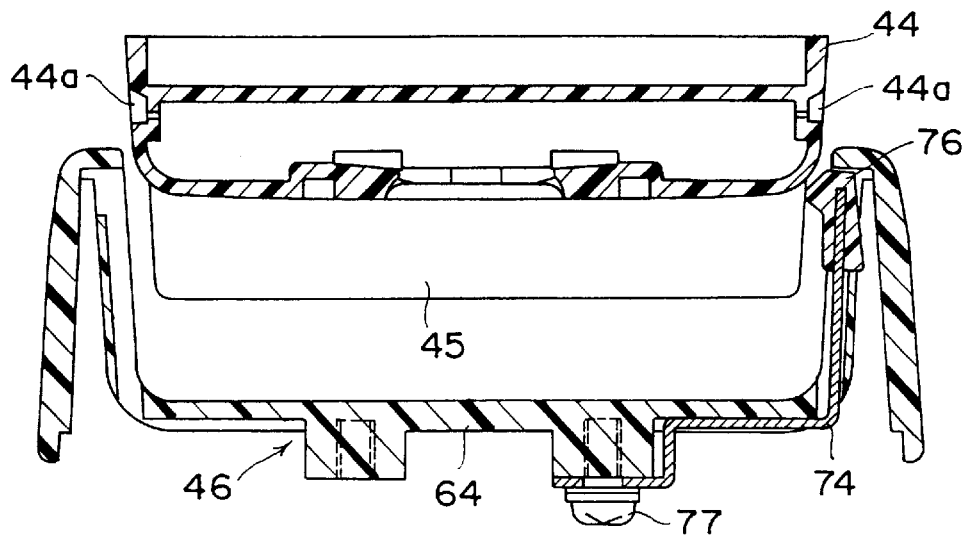
FIGS. 12A, 12B, and 12C are transverse sectional views illustrating the operation of mounting the portable telephone to the on-vehicle adapter.

Referring to FIG. 10, the on-vehicle adapter 46 is constructed of an upper case 64, a lower case 66, and a printed circuit board 68. The upper case 64 is formed with a recess 65 for receiving the portable telephone 44. Reference numerals 76 denote a pair of latches formed of a plastic material by molding, and reference numerals 74 denote a pair of resilient sheet metals fixedly engaged with the pair of latches 76, respectively. One end portion of each sheet metal 74 is inserted and fixed in the corresponding latch 76. As best shown in FIG. 12A, each sheet metal 74 is fixed at its other end portion to the lower surface of the upper case 64 by means of a screw 77. A pair of openings 75 are formed through opposed side walls of the recess 65 of the upper case 64, and the pair of latches 76 fixed to the sheet metals 74 are exposed from the pair of openings 75, respectively.

Figure 11:
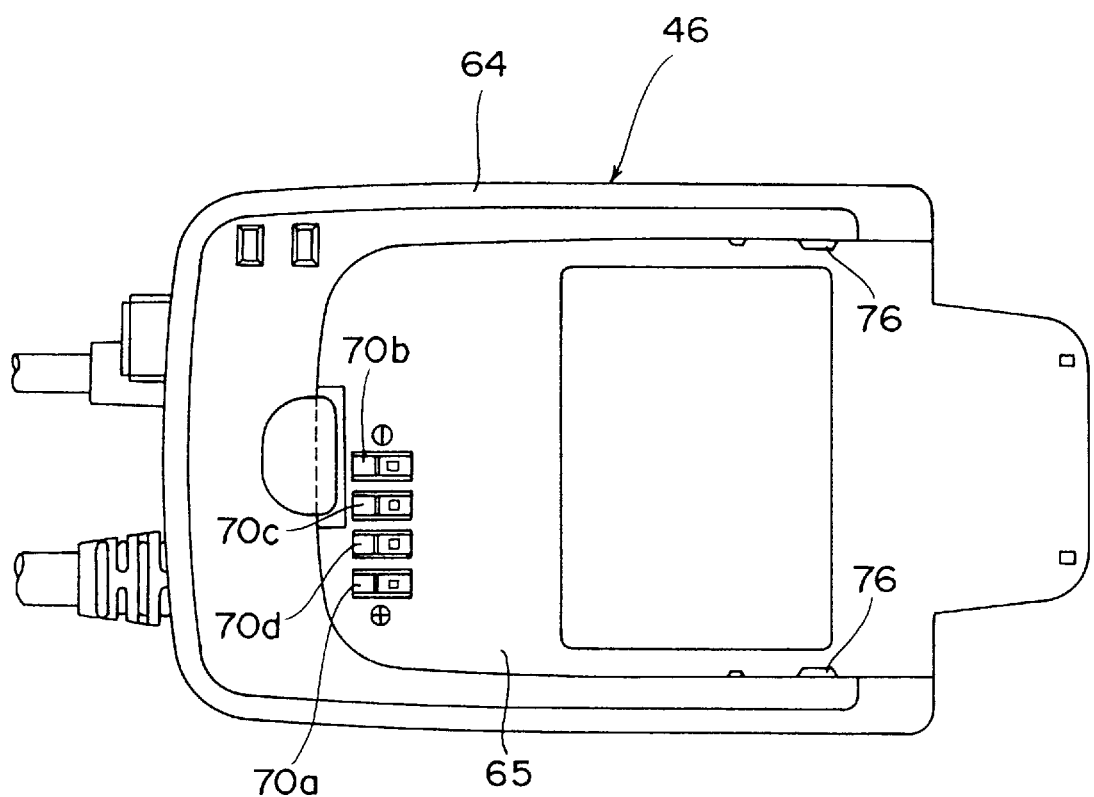
FIG. 11 is a plan view of the on-vehicle adapter.

The printed circuit board 68 is provided with a pair of charging terminals 70a and 70b, an auxiliary terminal 70c for on-hook/off-hook detection, and an auxiliary terminal 70d for battery pack identification. These terminals 70a to 70d are soldered to the printed circuit board 68. Reference numeral 72 denotes an LED as a charge indicator. As shown in FIG. 11, the pair of charging terminals 70a and 70b and the pair of auxiliary terminals 70c and 70d project upwardly from the bottom of the recess 65 of the upper case 64, and the pair of latches 76 project inwardly from the side walls of the recess 65 of the upper case 64.

Figure 12B:
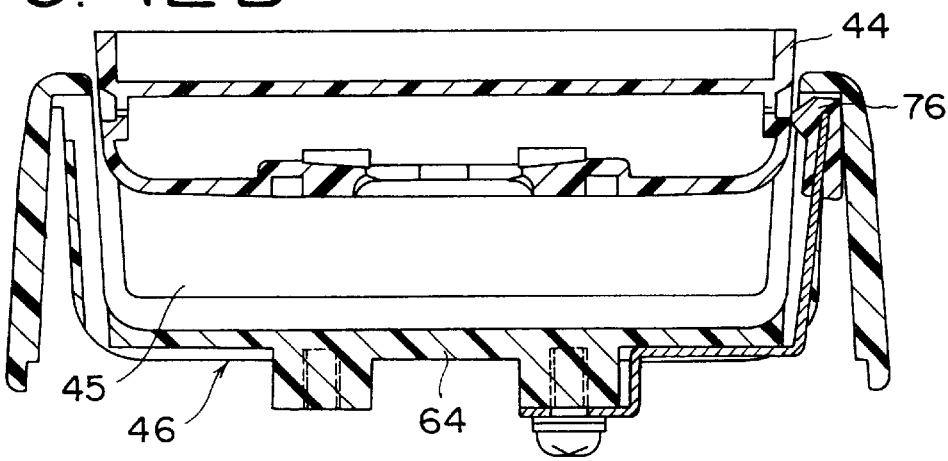
Figure 12C:
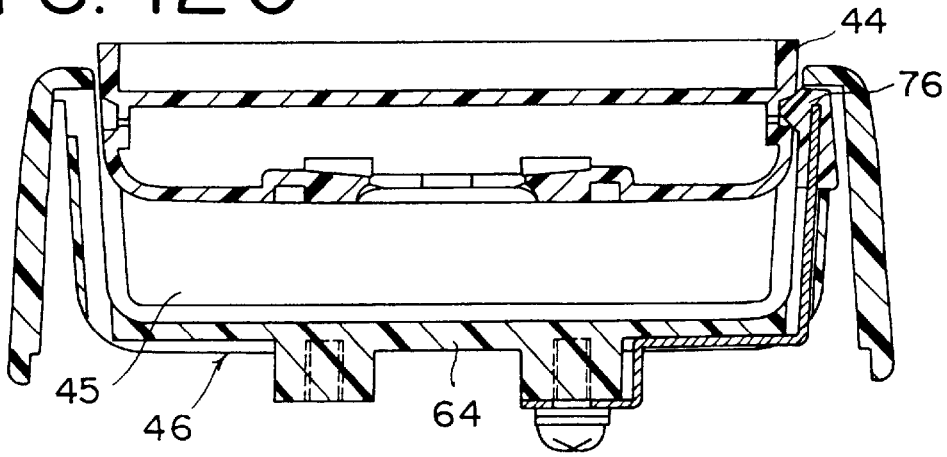

The way of mounting the portable telephone 44 to the on-vehicle adapter 46 will now be described with reference to FIGS. 12A to 12C.

As shown in FIG. 12A, the portable telephone 44 is inserted into the recess 65 of the upper case 64 of the on-vehicle adapter 46 from the upper side thereof. At this time, the latches 76 projecting from the openings 75 into the recess 65 are urged outwardly against the spring forces of the sheet metals 74 by the side surfaces of the portable telephone 44 as shown in FIG. 12B. When the portable telephone 44 is further inserted into the recess 65, the latches 76 come into engagement with a pair of notches 44a formed on the side surfaces of the portable telephone 44. Thus, the portable telephone 44 is fixedly held in the on-vehicle adapter 46 as shown in FIG. 12C.

Figure 13:
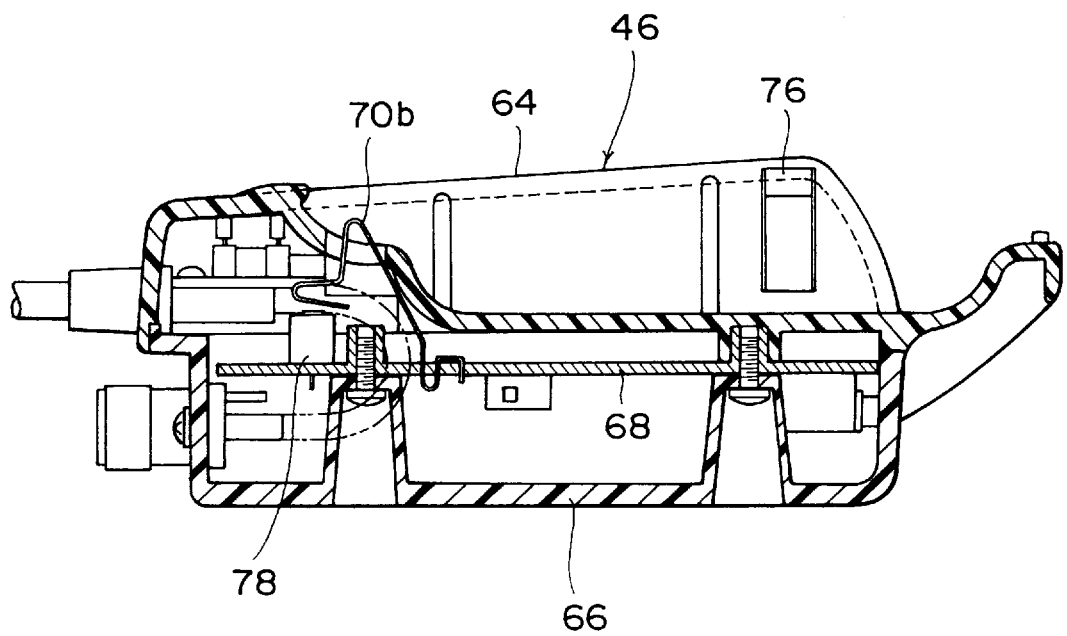
FIG. 13 is a longitudinal sectional view of the on-vehicle adapter.
Figure 14:
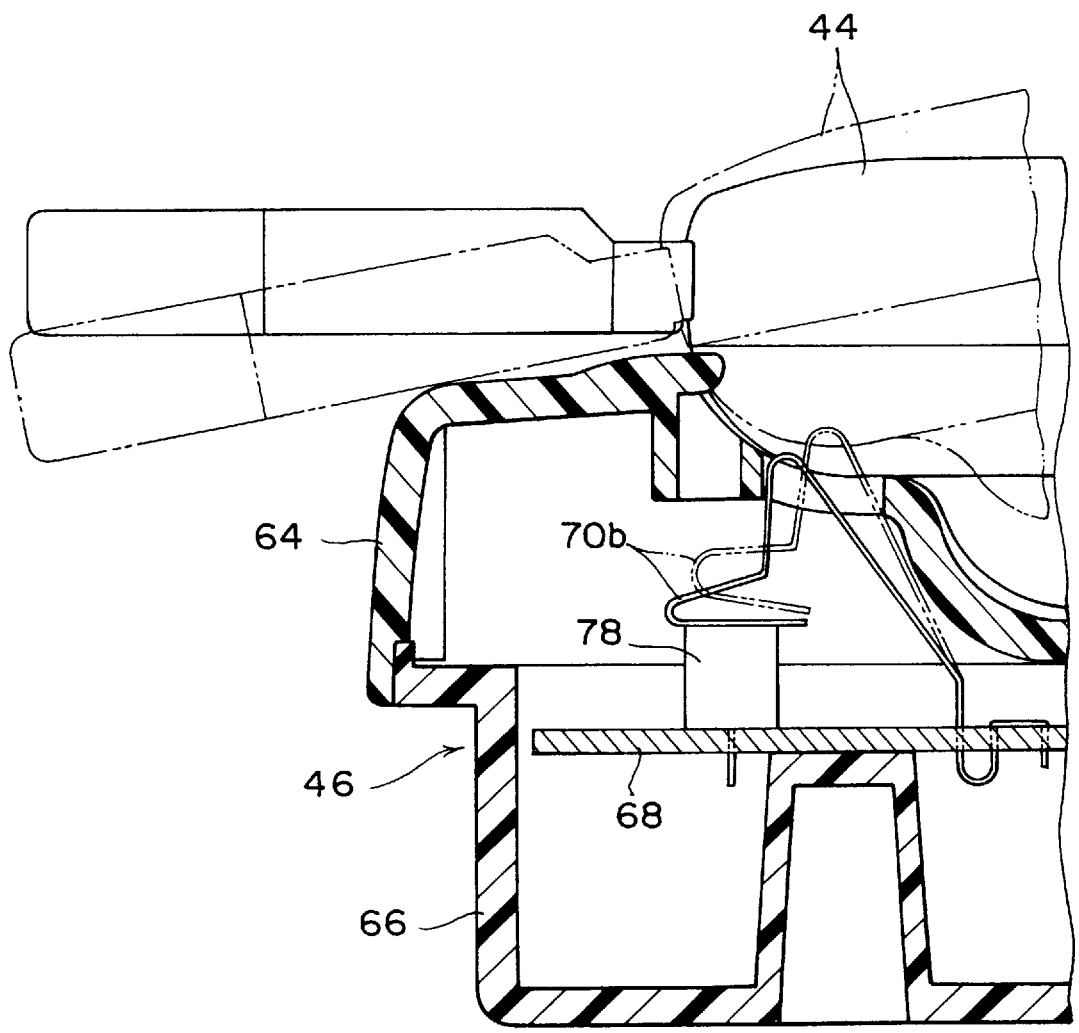
FIG. 14 is a longitudinal sectional view of an essential part of the on-vehicle adapter, illustrating a mechanical on-hook/off-hook detecting mechanism.

Referring to FIGS. 13 and 14, a microswitch 78 for detecting the on-hook or off-hook condition of the portable telephone 44 is mounted on the printed circuit board 68. The microswitch 78 is located just under the charging terminal 70b. When the portable telephone 44 is mounted on the on-vehicle adapter 46, the microswitch 78 is depressed by the charging terminal 70b as shown by a solid line in FIG. 14.

Figure 15:
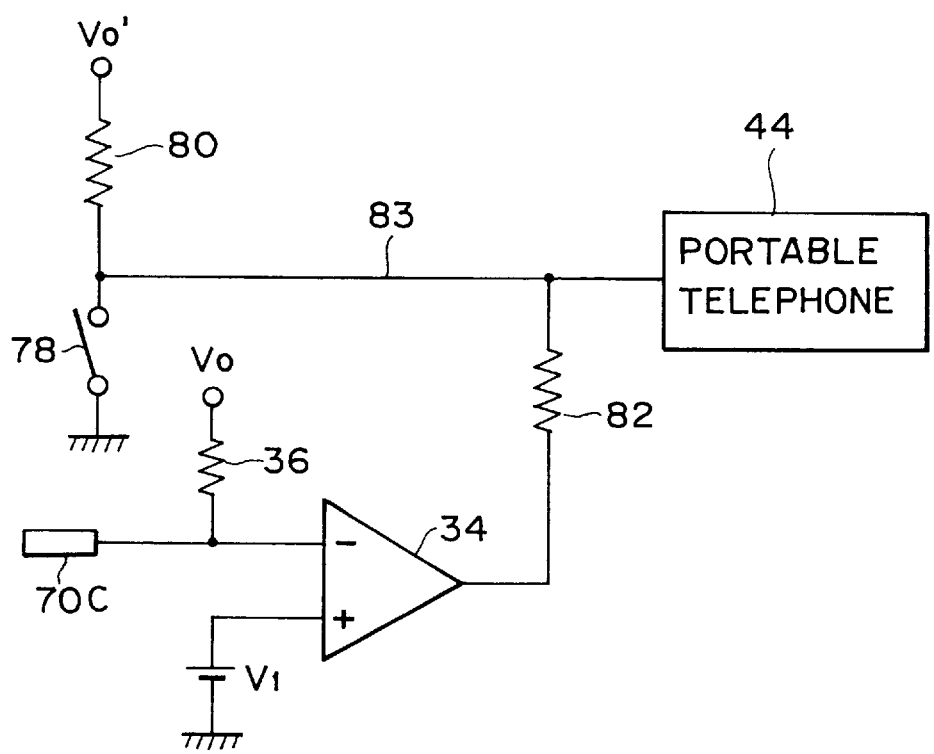
FIG. 15 is a diagram of an on-hook/off-hook detecting circuit according to another preferred embodiment of the present invention.

Referring to FIG. 15, there is shown a preferred embodiment of an on-hook/off-hook detecting circuit employing a mechanical on-hook/off-hook detecting mechanism including the microswitch 78 mentioned above. The microswitch 78 is connected through a resistor 80 to a power source, and is also connected through a line 83 to the portable telephone 44. The output terminal of a first operational amplifier 34 similar to that shown in FIG. 3 is connected through a resistor 82 to the line 83.

With this circuit construction, the mechanical on-hook/off-hook detecting mechanism utilizing the microswitch 78 and the electrical on-hook/off-hook detecting circuit utilizing the operational amplifier 34 and the reference voltage $V_1$ can be combined.

Figure 16:
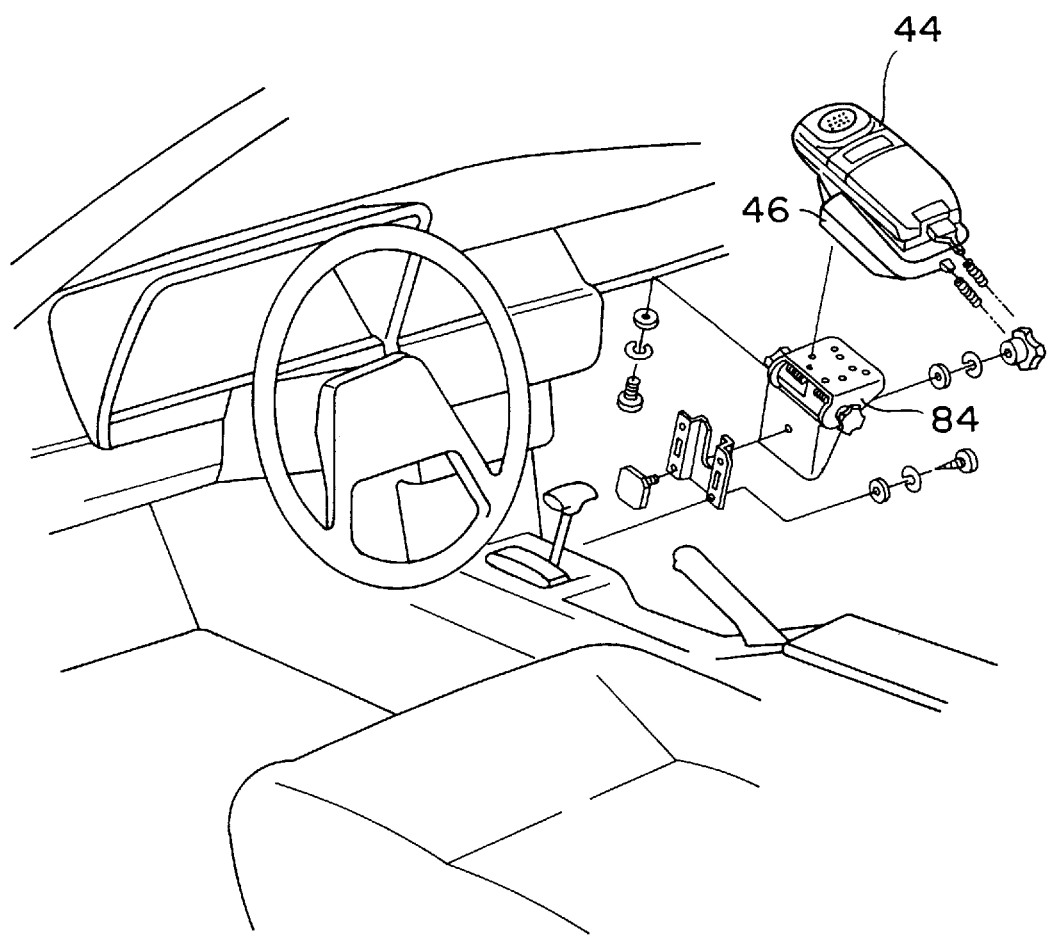
FIG. 16 is an exploded perspective view illustrating the way of mounting the on-vehicle adapter to an automobile.

As shown in FIG. 16, the on-vehicle adapter 46 is mounted on a clamshell 84, and the clamshell 84 is mounted on a side surface of a console box in an automobile.

Figure 17:
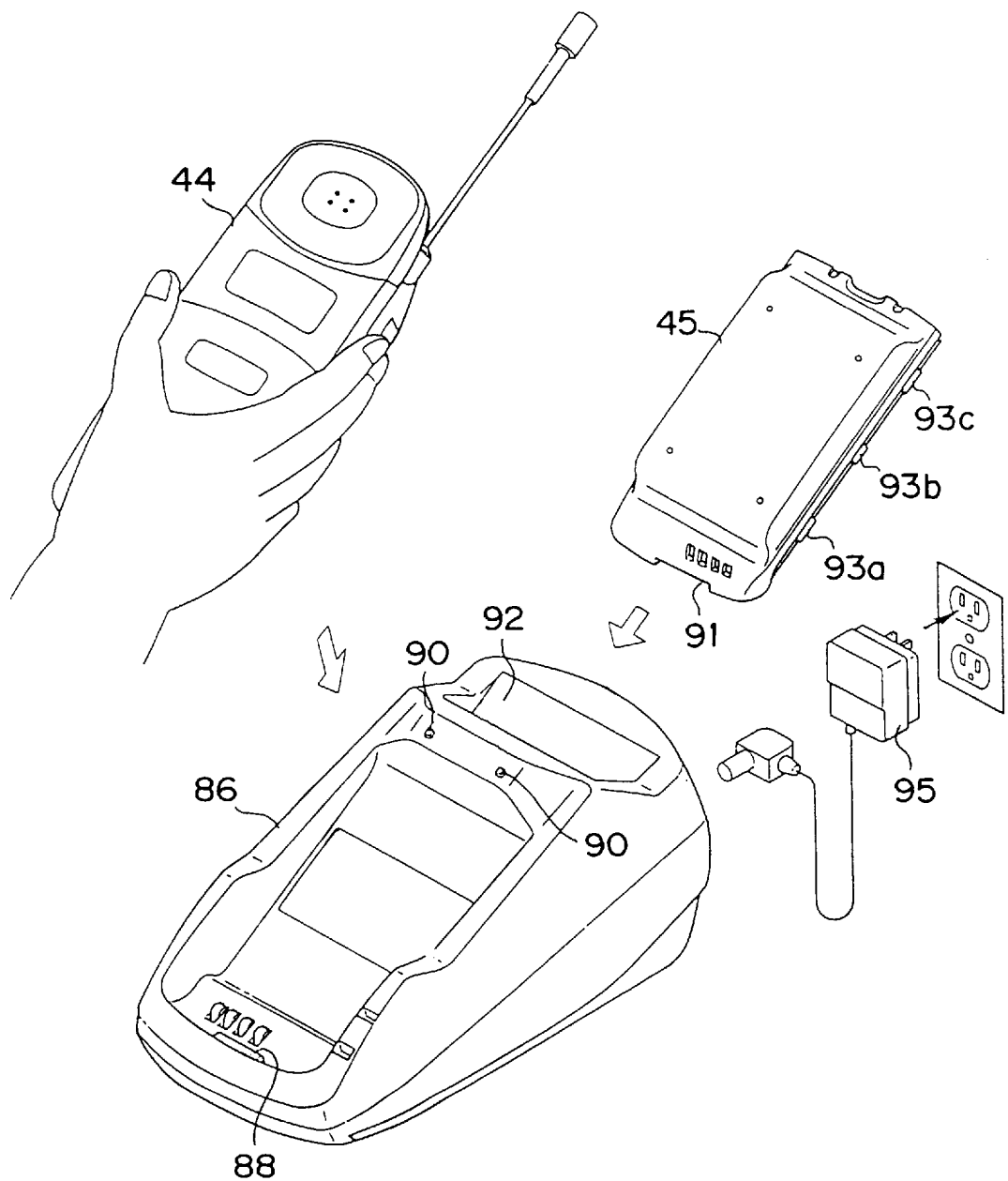
FIG. 17 is a perspective view of a desktop charger.

Referring to FIG. 17, there is shown a perspective view of a desktop charger 86 including an on-hook/off-hook detecting circuit and a battery identifying circuit according to the present invention. Further, there is shown in FIG. 18 an exploded perspective view of the desktop charger 86.

Figure 18:
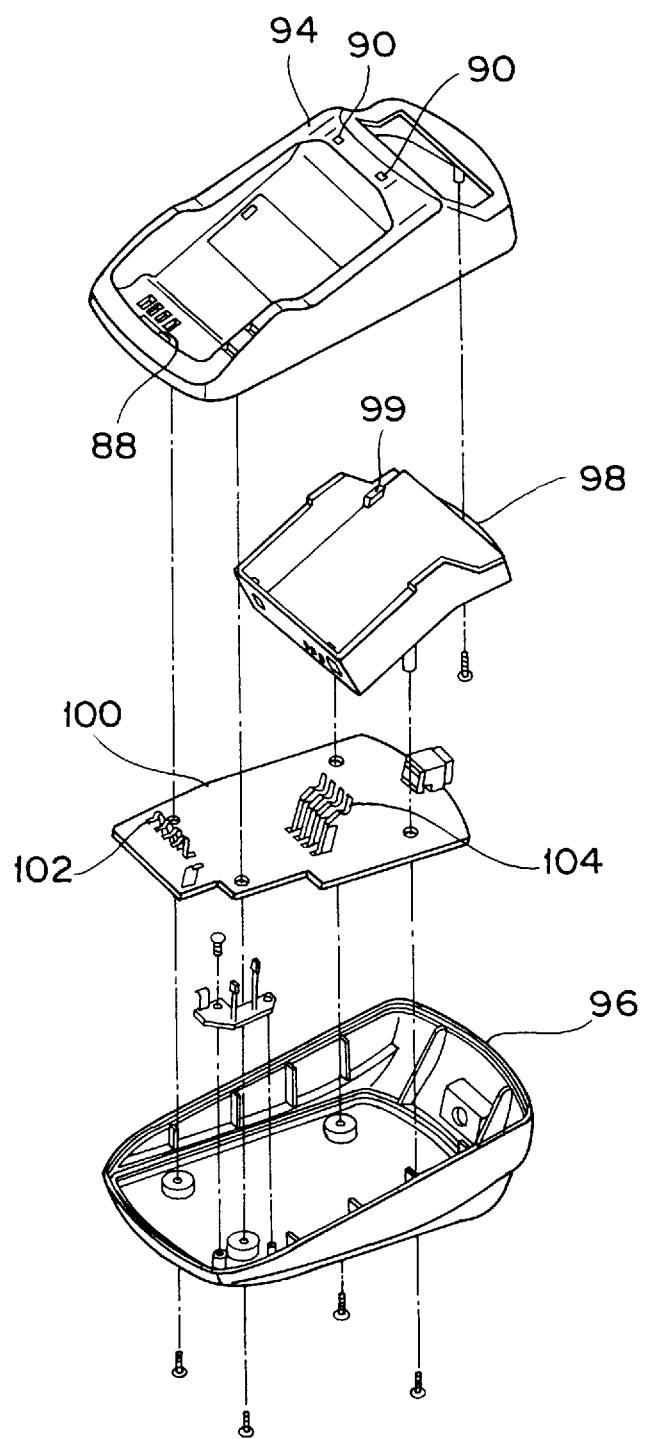
FIG. 18 is an exploded perspective view of the desktop charger.

As shown in FIG. 18, the desktop charger 86 is generally constructed of an upper case 94, a lower case 96, an inner case 98, and a printed circuit board 100. The upper case 94 is formed with a projection 88 adapted to engage with a recess 91 of the battery pack 45. The upper case 94 is further formed with two projections 90 adapted to respectively engage with two recesses (not shown) of the battery pack 45. Accordingly, the battery pack 45 attached to the portable telephone 44 can be securely mounted on the desktop charger 86 in such a manner that the recess 91 and the two recesses of the battery pack 45 are engaged with the projection 88 and the two projections 90 of the upper case 94 of the desktop charger 86, respectively.

Two sets of terminals 102 and 104 are soldered to the printed circuit board 100. Each set of terminals 102 and 104 consists of a pair of charging terminals, an auxiliary terminal for on-hook/off-hook detection, and an auxiliary terminal for battery pack identification. The inner case 98 is formed with a pair of pawls 99 for fixing the battery pack 45. The inner case 98 is assembled with the upper case 94 as shown in FIG. 17 to define a pocket 92 for receiving the battery pack 45 detached from the portable telephone 44. Thus, even when the battery pack 45 is detached from the portable telephone 44, the battery pack 45 can be solely charged. As shown in FIG. 17, each side surface of the battery pack 45 is formed with three projections 93a, 93b, and 93c (only one side surface being shown). Reference numeral 95 denotes an AC/DC adapter.

Figure 19A:
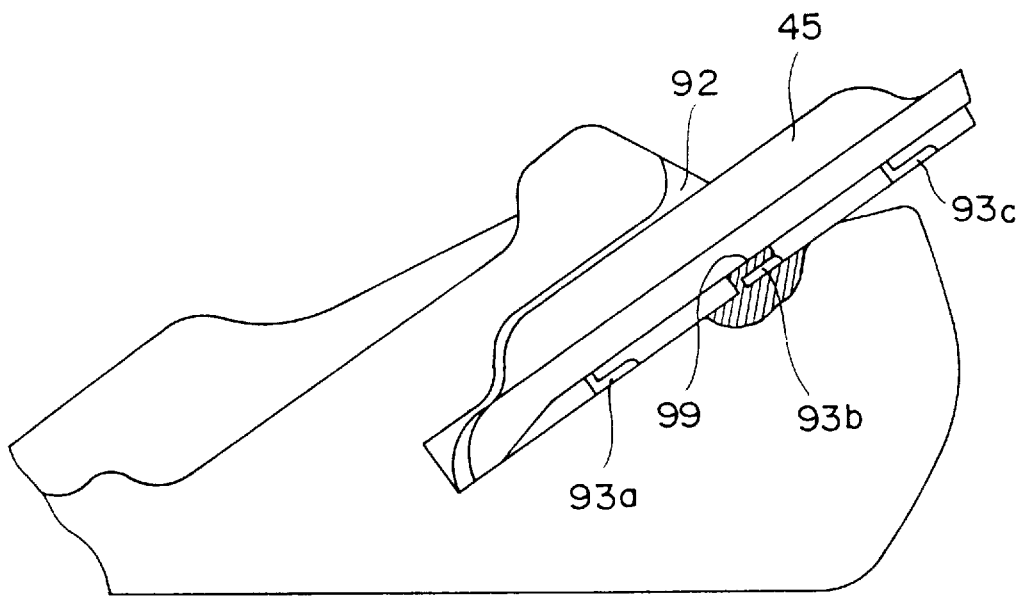
FIG. 19A is a schematic sectional side view illustrating a properly inserted condition of a battery pack inserted into the desktop charger with a proper orientation.

FIG. 19A shows a properly inserted condition of the battery pack 45. When the battery pack 45 is inserted into the pocket 92 with a proper orientation, the leading end of the battery pack 45 reaches the bottom of the pocket 92 as shown in FIG. 19A, and the central projections 93b of the battery pack 45 come into engagement with the pawls 99 of the inner case 98 of the desktop charger 86 to thereby prevent floating of the battery pack 45. Accordingly, each terminal of the battery pack 45 comes into pressure contact with each terminal 104 of the desktop charger 86, thereby reliably charging the battery pack 45.

Figure 19B:
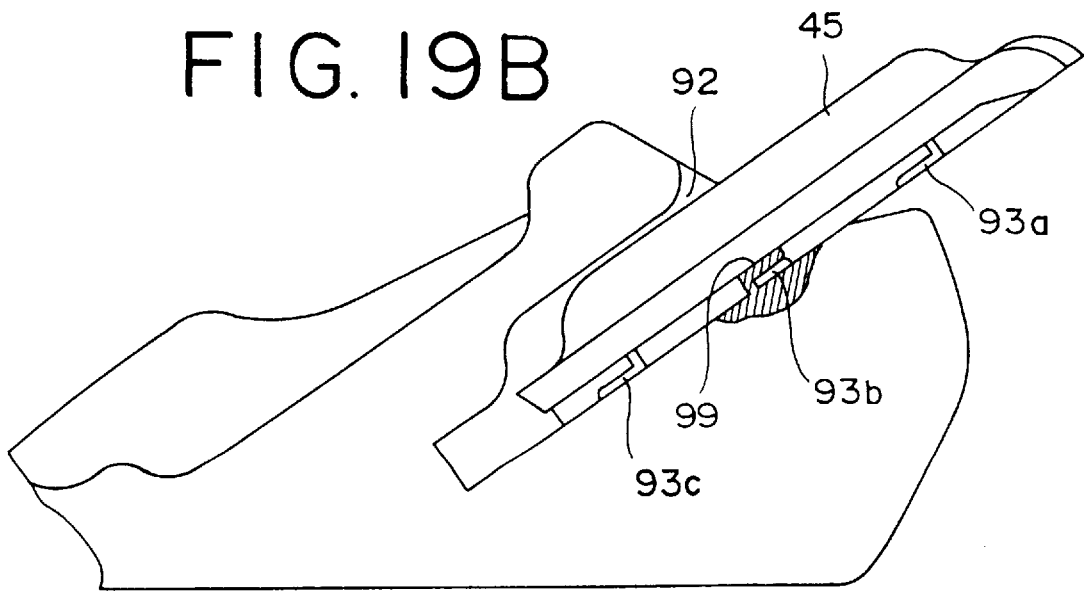
FIG. 19B is a schematic sectional side view illustrating an improperly inserted condition of the battery pack inserted into the desktop charger with an improper orientation, so as to demonstrate a structure for preventing an error such that the battery pack will be reversely inserted.

FIG. 19B shows an improperly inserted condition of the battery pack 45. When the battery pack 45 is inserted into the pocket 92 with an improper orientation, i.e., an orientation reverse to the proper orientation shown in FIG. 19A, the central projections 93b of the battery pack 45 come into engagement with the pawls 99 of the desktop charger 86 before the leading end of the battery pack 45 reaches the bottom of the pocket 92. In other words, the leading end of the battery pack 45 cannot reach the bottom of the pocket 92 in such an improperly inserted condition, thereby preventing an error such that the battery pack 45 will be inserted into the pocket 92 with the improper orientation.

Figure 20:
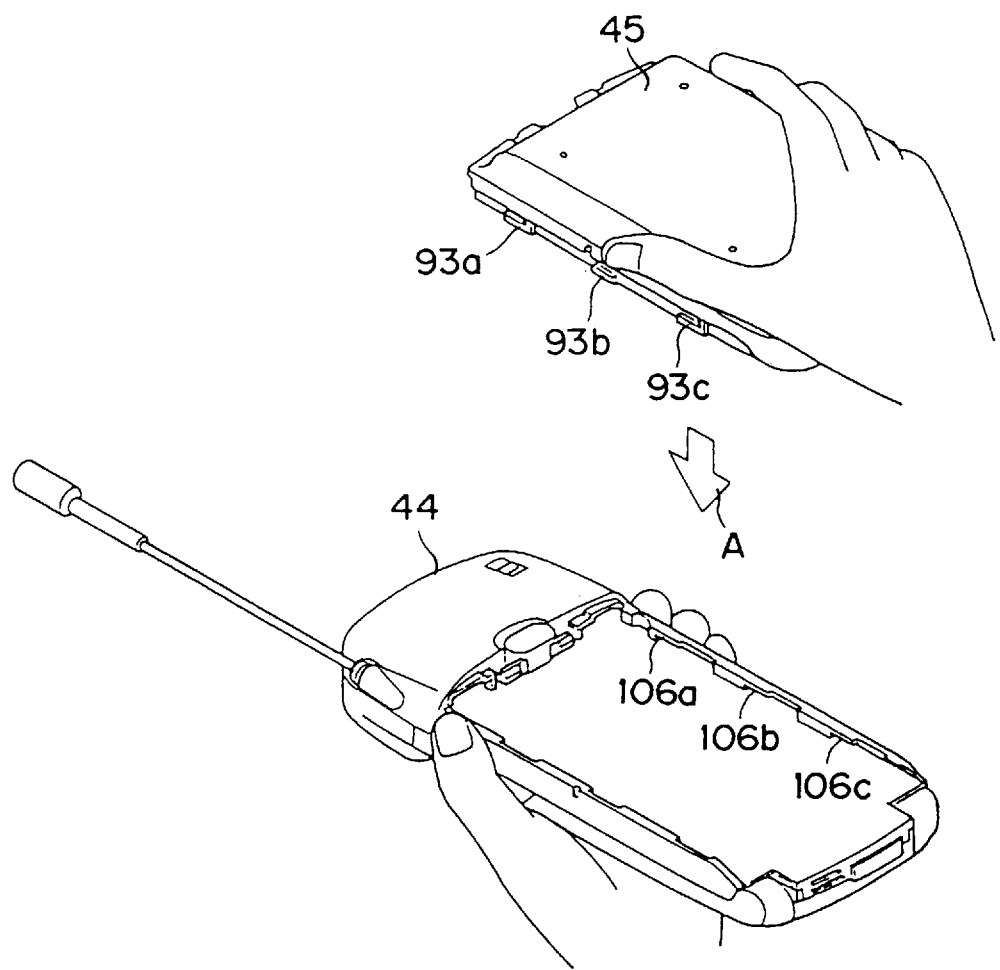
FIGS. 20 and 21 are perspective views illustrating the way of mounting the battery pack to the portable telephone.
Figure 21:
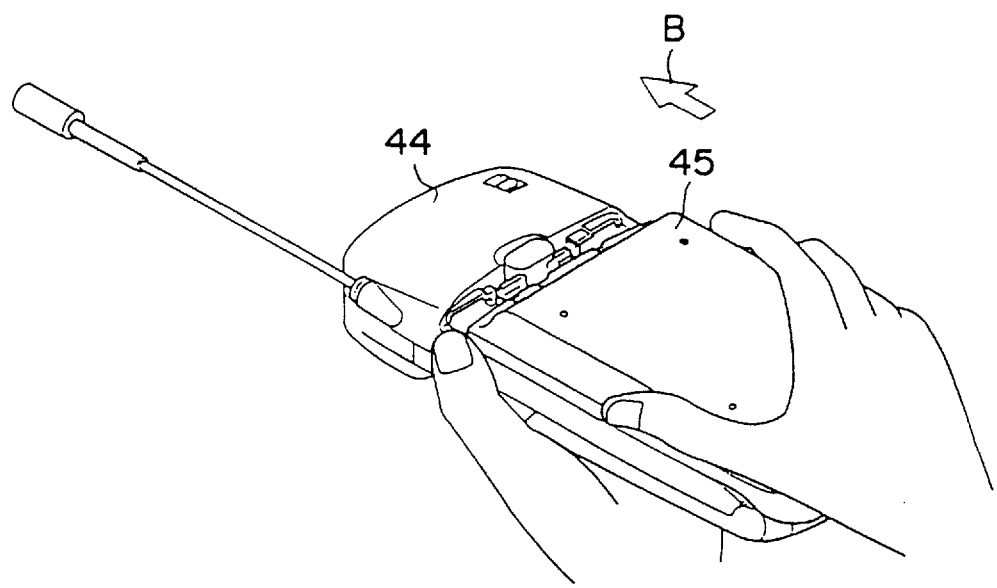

As shown in FIG. 20, each side portion of the portable telephone 44 on the back side thereof is formed with three pawls 106a, 106b, and 106c adapted to engage with the three projections 93a, 93b, and 93c of the battery pack 45, respectively. The battery pack 45 is mounted on the portable telephone 44 by first putting the battery pack 45 on the back surface of the portable telephone 44 as shown by an arrow A in FIG. 20 and then forcibly sliding the battery pack 45 in a direction as shown by an arrow B in FIG. 21 to engage the projections 93a, 93b and 93c of the battery pack 45 with the pawls 106a, 106b and 106c of the portable telephone 44. Thus, the battery pack 45 is securely retained to the portable telephone 44.

As described above, according to the present invention, the on-hook/off-hook condition of the portable terminal equipment can be detected even when the nickel-hydride battery pack is used as a power source. Further, the nickel-cadmium battery pack and the nickel-hydride battery pack can be distinguished, and charge control peculiar to the battery pack mounted to the charger can be carried out. Further, the detection of the on-hook/off-hook condition corresponds to the detection of the connected/disconnected condition of the battery. Accordingly, the safety can be improved by controlling to stop the outputs from the charging terminals in the disconnected condition of the battery.

What is claimed is:

1. A charger for portable terminal equipment, said charger being capable of selectively charging a first battery pack and a second battery pack; said first battery pack having a pair of first charging terminals, a first auxiliary terminal, and a thermistor connected to said first auxiliary terminal; said second battery pack having a pair of second charging terminals and a second auxiliary terminal grounded; said charger comprising:

a charging circuit;

a pair of third charging terminals connected to said charging circuit and adapted to be selectively connected to one of said pair of first charging terminals of said first battery pack and said pair of second charging terminals of said second battery pack;

a third auxiliary terminal adapted to be selectively connected to one of said first auxiliary terminal of said first battery pack and said second auxiliary terminal of said second battery pack, said third auxiliary terminal being connected to a power source through a pull-up resistor;

first means for comparing a voltage at said third auxiliary terminal with a first reference voltage and detecting one of an on-hook condition and an off-hook condition of said portable terminal equipment, said first reference voltage being set lower than a voltage at said third auxiliary terminal;

second means for comparing the voltage at said third auxiliary terminal with a second reference voltage lower than said first reference voltage and distinguishing said first battery pack and said second battery pack, said second reference voltage being set lower than a voltage at said third auxiliary terminal when said portable terminal equipment having said first battery pack is on-hooked;

means for detecting full charge of said first battery pack; and means for cutting off an output power from said pair of third charging terminals according to a detection of the full charge of said first battery pack.

2. A charger for portable terminal equipment according to claim 1, wherein said first means comprises:

a first operational amplifier having a positive-phase input terminal connected to said first reference voltage and a negative-phase input terminal connected to said third auxiliary terminal; and a pull-up resistor connected between said third auxiliary terminal and a power source;

said first reference voltage being set at a level higher than the voltage at said third auxiliary terminal.

3. A charger for portable terminal equipment according to claim 2, wherein said second means comprises a second operational amplifier having a positive-phase input terminal connected to said second reference voltage and a negative-phase input terminal connected to said third auxiliary terminal; and wherein said first battery pack is identified when an output from said second operational amplifier is low, while said second battery pack is identified when the output from said second operational amplifier is high.

4. A charger for portable terminal equipment according to claim 1, further comprising switch means connected to one of said third charging terminals and said third auxiliary terminal, for detecting one of the on-hook condition and the off-hook condition of said portable terminal equipment.

5. A charger for portable terminal equipment according to claim 1, further comprising means for cutting off an output power from said pair of third charging terminals when said pair of third charging terminals is disconnected from said pair of first charging terminals of said first battery pack and said pair of second charging terminals of said second battery pack.

6. A charger for portable terminal equipment according to claim 1, wherein said first battery pack comprises a nickel-hydride battery pack, and said second battery pack comprises a nickel-cadmium battery pack.

7. A charger for portable terminal equipment comprising:

charging means for selectively charging a first battery pack and a second battery pack, said first battery pack having a pair of first charging terminals, a first auxiliary terminal and a first impedance connected to said first auxiliary terminal; said second battery pack having a pair of second charging terminals, a second auxiliary terminal and a second impedance connected to said second auxiliary terminal;

a third auxiliary terminal adapted to be selectively connected to one of said first auxiliary terminal of said first battery pack and said second auxiliary terminal of said second battery pack;

a power source connected to said third auxiliary terminal through a pull-up resistor; and means for detecting one of an on-hook condition and an off-hook condition of said portable terminal equipment and distinguishing said first battery pack and said second battery pack in response to a voltage at said third auxiliary terminal.

8. A charger for portable terminal equipment comprising:

charging means for selectively charging a first battery pack and a second battery pack, said first battery pack having a pair of first charging terminals, a first auxiliary terminal and a first impedance connected to said first auxiliary terminal; said second battery pack having a pair of second charging terminals, a second auxiliary terminal and a second impedance connected to said second auxiliary terminal;

a third auxiliary terminal adapted to be selectively connected to one of said first auxiliary terminal of said first battery pack and a said second auxiliary terminal of said second battery pack;

a power source connected to said third auxiliary terminal through a pull-up resistor; and means for directly identifying said first battery pack and said second battery pack in response to a voltage at said third auxiliary terminal.

\* \* \* \* \*